Sept. 1, 19 3,526,883

MAGNETIC DOMAIN DISPLAY DEVICE

Filed Oct. 9, 1968 2 Sheets-Sheet 1

INVENTOR
W. J. TABOR
BY Herbert M. Shapiro
ATTORNEY

United States Patent Office 3,526,883
Patented Sept. 1, 1970

3,526,883

MAGNETIC DOMAIN DISPLAY DEVICE

William J. Tabor, New Providence, N.J., assignor to Bell Telephone Laboratories, Incorporated, Murray Hill, N.J., a corporation of New York Filed Oct. 9, 1968, Ser. No. 766,276
Int. Cl. G11c *11/14, 11/42, 5/02*
U.S. Cl. 340—174 11 Claims

ABSTRACT OF THE DISCLOSURE

Concentric rings of magnetically soft material define stable positions for a single wall domain in a storage position in an underlying magnetic sheet. The smallest ring is covered by an opaque disk to extinguish polarized light passed by the domain when its size corresponds to that of the smallest ring. An array of such storage positions forms a simple optical display.

FIELD OF THE INVENTION

This invention relates to data processing arrangements and, more particularly, to such arrangements employing sheets of magnetic materials in which single wall domains can be moved.

BACKGROUND OF THE INVENTION

A single wall domain is a region of magnetic material having a magnetization reversed from that of the surrounding regions and separated therefrom by a single domain wall which closes on itself. The diameter of the domain is a function of the material parameters and a bias field of a polarity to contract the domain. Accordingly, the domain is substantially independent of the boundary of the sheet in the plane in which it is moved. Such domains can be moved anywhere in the sheet and various logic operations can be performed therebetween as disclosed in copending application Ser. No. 657,877, filed Aug. 2, 1967 for A. H. Bobeck, H. E. D. Scovil, and W. Shockley.

A typical sheet in which single wall domains can be moved comprises a rare earth orthoferrite such as terbium orthoferrite. These materials are characterized by a preferred direction of magnetization along an axis substantially normal to the plane of the sheet. If we adopt the convention that a positive direction along that axis is upward out of the sheet and a negative direction is downward along that axis, a single wall domain may be visualized as an encircled plus sign where the circle represents the single domain wall thereabout.

It is known that magnetic domains can be viewed with polarized light employing the Faraday or Kerr effects. The Faraday effect takes advantage of the fact that a single wall (positively magnetized) domain rotates the direction of polarization of polarized light transmitted therethrough in a sense opposite to that in which the remaining regions (negative) rotate that polarization. An analyzer set to extinguish light transmitted through material magnetized in the reference negative direction passes only that light transmitted through the single wall domain. The Kerr effect is similar for reflected light.

An object of this invention is to provide a single wall domain memory which utilizes the Faraday effect to realize an optical display useful in a visual telephone or television display or the like.

It is also known that single wall domains are attracted to magnetically soft materials overlying the positions occupied by domains. For example, the threshold for propagation of a domain away from an occupied position is increased considerably if a permalloy dot is deposited on the surface of the magnetic sheet at that position.

BRIEF DESCRIPTION OF THE INVENTION

The attraction between magnetically soft materials and single wall domains is turned to account to provide a memory in which a single wall domain can be driven to any one of a number of stable sizes by a change in a bias field at the position occupied by the domain. In one embodiment, a domain permanently occupies each of an array of positions in a suitable magnetic sheet. Each position is defined by a set of concentric permalloy rings encompassed by X and Y conductors. The center ring is covered completely by a disk which is opaque to light transmitted through the material. The amount of light passed by each position depends on the size of the domain which can be expanded or contracted controllably to coincide with a selected ring.

The realization of a controlled light intensity at each position along with a memory enables, for example, enhanced television operation.

DETAILED DESCRIPTION

Figure 1:
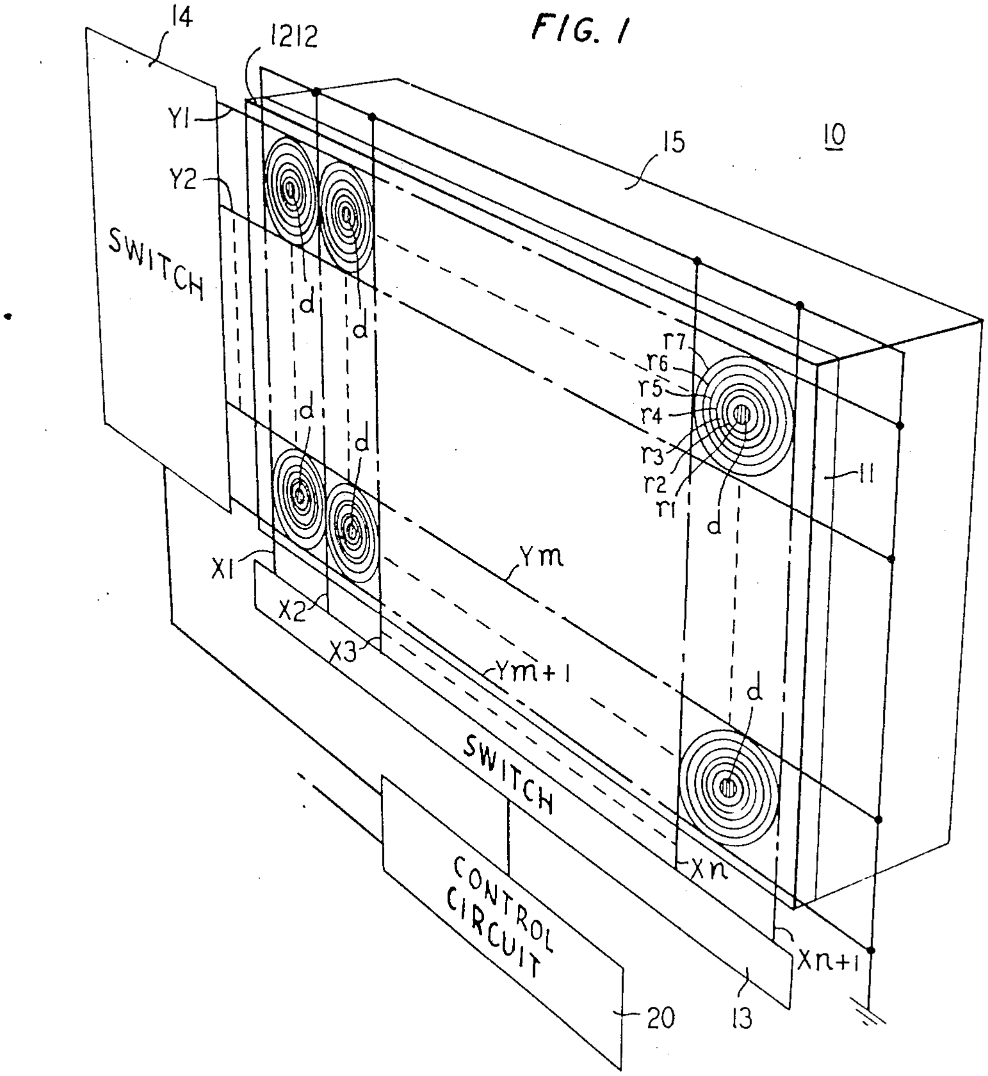
FIG. 1 is a schematic representation of a memory arrangement in accordance with this invention.

FIG. 1 shows an arrangement 10 in accordance with this invention. The arrangement includes a sheet 11 in which single wall domains can be moved.

An array of storage positions is defined in sheet 11 by intersecting X and Y conductors X1, X2 . . . X*n*, X*n*+1 and Y1, Y2 . . . Y*m*, Y*m*+1. The X and Y conductors are connected between switches 13 and 14 respectively and ground. The conductors are deposited on the surface of sheet 11 conveniently by photoresist techniques and are electrically isolated from one another.

Each storage position includes a set of concentric rings *r*1, *r*2, *r*3, . . . *r*7 of a magnetically soft material also deposited conveniently by photoresist techniques. A typical set of rings may comprise seven rings each having a width of one-half mil on three mil centers. Illustratively, seven rings are shown for compatibility with television requirements as is discussed more fully hereinafter. A disk *d*, opaque to incident polarized light, covers the area encompassed by and including ring *r*1 in each storage position.

Each storage position also includes a single wall domain normally occupying the area covered by the disk. Domains are provided conveniently by saturating sheet 11 magnetically in one direction and by introducing domains into the sheet conveniently from a domain source. The source may comprise a region having its magnetization in a positive direction from which an area is severed by a conductor, overlying the region, when pulsed. An input of this type is shown in copending application Ser. No. 579,931, filed Sept. 16, 1966 and now U.S. Pat. 3,460,116 for A. H. Bobeck, U. F. Gianola, R. C. Sherwood, and W. Shockley. Domains are provided in this manner until the domains arrange themselves in an array in accordance with well understood magnetostatic considerations modified by the presence of the magnetically soft material. The array of storage positions is designed to coincide with the array of domains. The domains remain permanently in their respective positions once properly located as will become clear from the illustrative operation hereinafter.

Figure 2:
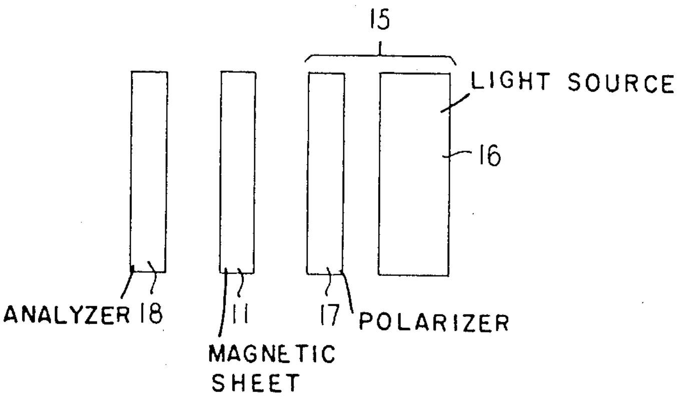
FIGS. 2, 3, and 4 are schematic representations of portions of the arrangement of FIG. 1.

The amount of light passed by a storage position in FIG. 1 depends upon the size of a single wall domain at that position. For example, FIG. 1 shows a source of polarized light 15 which may comprise a source 16 and a polarizer 17 as shown in FIG. 2. Source 15 is positioned adjacent one face of sheet 11 with an analyzer 18 adjacent the other face. Analyzer 18, which may be a plane type or an elliptic type in accordance wtih the teaching of copending application Ser. No. 674,832 filed Oct. 12, 1967 for A. H. Bobeck, W. J. Tabor and A. A. Thiele, is set to extinguish all light passed by sheet 11 except that rotated by passage through a single wall domain. When a domain is contracted to a size of and in a position occupied by an opaque disk, no light passes. If, however, a domain is grown to occupy the space encompassed by each of the consecutive rings formed at each storage position, more and more light is passed. For seven rings at each position, seven intensities are realizable in controllable increments of, say, three decibels. Accordingly, a 20-decibel range useful in television implementations is provided.

Figure 3:
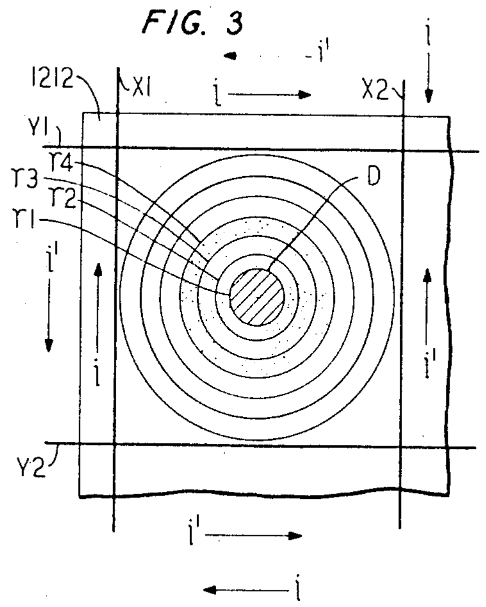

A domain at a selected position is driven to an appropriate size by pulses providing an expand or a contract field at each position depending on the present size of the domain and the size desired to give the selected light intensity. It is important at this juncture to understand that a domain wall likes to align itself wih a magnetically soft overlay because such a position is a least-energy position. Accordingly, a single wall domain is expanded or contracted between stable locations in which a domain wall aligns with a ring. FIG. 3 shows, as a stippled area, a domain in a location where the encompassing wall aligns with ring *r4* of an illustrative storage position 1212. Current pulses in conductors Y1Y2 and X1X2, defining that position, in the directions indicated by the arrows *i* in FIG. 3 generate a field directed into the plane of sheet 11 and thus of a polarity to contract domain D to the location shown in FIG. 4. On the other hand, current pulses on those conductors as indicated by the arrows *i* in FIG. 4 generate a field directed out of the plane to expand domain D to the location shown in FIG. 3. In this manner, the size of a domain in each storage position is controlled responsive to current pulses for achieving a controlled light intensity responsive to input signals. Switches 13 and 14 of FIG. 1 are connected to a control circuit 20 to this end.

The magnetically soft rings at each position are sufficiently attracting to domain walls to establish a threshold to domain wall motion. Such a threshold is typically 6 oersteds for a permalloy ring of few thousand Angstrom units thick. Moreover, this threshold is a function of the ring geometry (i.e., thickness) and thus is controllable in accordance with considerations well understood in the art. The current pulses supplied for changing domain size are of a magnitude to supply a field of less than 6 oersteds, coincident pulses being necessary for a selection.

The pulses may be controlled to provide raster scan of a type compatible with conventional television operation. In this arrangement, switches 13 and 14 may comprise synchronized stepping switches for providing the familiar scanning pattern. The light intensity at each storage position is determined by the duration and/or number of current pulses supplied while each storage position is enabled. Thus, the stepping switches enable the storage positions consecutively and the control circuit 20 of FIG. 1 supplies the current pulses responsive to conventional input signals.

Figure 4:
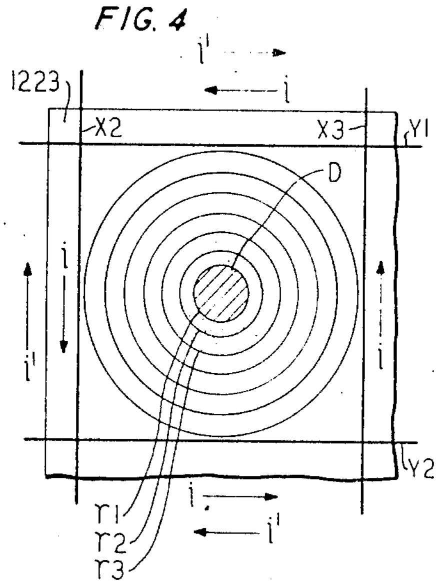
Figure 5:
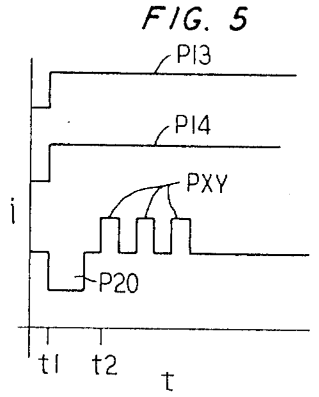
FIG. 5 is a pulse diagram of the operation of the arrangement of FIG. 1.

FIG. 5 shows a pulse diagram for a typical operation for determining the size of a domain in a selected storage position. Switches 13 and 14 enable position 1212 as indicated by the pulses P13 and P14 initiated at time *t1* in FIG. 5. A pulse of a polarity to contract domains is applied initially to reduce the size of the domain at the selected position to that of the *r1* ring thus extinguishing light at that position. This pulse is represented by pulse form P20 in FIG. 5 and is of longer duration than subsequent pulses, which expand domains, in order to insure contraction to minimum size. Thereafter at time *t2* in FIG. 5, consecutive pulses are applied under the control of control circuit 20 to each of conductors X1, X2, Y1, and Y2 as indicated collectively by pulses PXY in the figure. The domain grows to a size encompassed by ring *r4* as shown in FIG. 4. Each input signal thus comprises a "return-to-zero" pulse followed by a number of pulses corresponding to the number of rings to which the domain is to grow.

Figure 6:
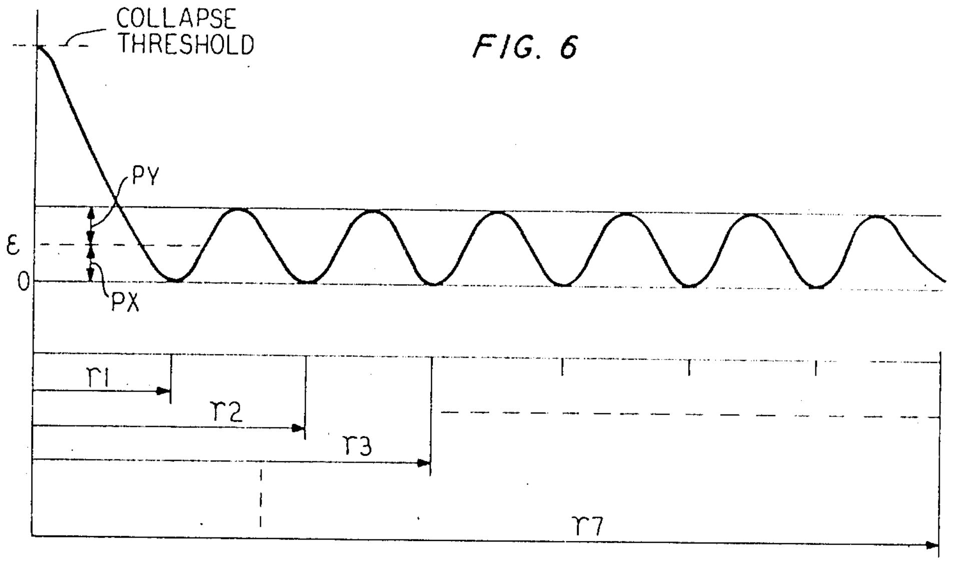
FIG. 6 is an energy diagram of a storage position of the arrangement of FIG. 1.

A single wall domain is characterized by a collapse threshold, which is not exceeded when pulse P20 is applied, as is indicated in FIG. 6.

FIG. 6 shows a graph of energy $\epsilon$ versus distance $r$ from the center of an opaque disk at a storage position. It is clear that an energy well is created by each magnetically soft ring. The fields generated by the pulses applied to the X and Y conductors must be sufficient to exceed a threshold defined by the energy humps as shown in the figure. Each pulse is of an amplitude to insure that the theshold is exceeded at the selected storage position but not at a nonselected position. Each pulse also has a duration which insures that the domain expands beyond the next consecutive energy maximum but does not exceed the energy maximum after that. In an alternative mode of operation, the pulses *pX* and *pY* can be of durations which determine a number of energy humps the domain passes. The mobility of a domain in the sheet determines the duration of the applied pulses in each instance.

In a still different mode of operation, no return-to-zero signal is applied at time *t1* in FIG. 5. Rather, the input signal is representative of the difference between the domain size during the next preceding frame and the present. Both expand and contract signals are sent in this instance, each of an amplitude and duration in keeping with the above discussion.

When the size of a domain is changed at a selected position by concurrent pulses on X and Y conductors, other positions along those X and Y conductors are partially selected. Such partial selection causes no undesired changes in sizes of domains in the positions so affected. This is clear from a comparison of adjacent storage positions as shown in FIGS. 3 and 4. Currents flowing as indicated in FIG. 3 by arrows designated *i'* cause an expansion field in selected position 1212. The arrows *i'* similarly represent the currents which generate an expansion field simultaneously in the nonselected storage position of FIG. 4. The currents in conductors Y1 and Y2 are seen to generate a field of a polarity to expand a domain in position 1212. But no current flows in conductor X3 of FIG. 4 at this time and a current of a polarity to contract domains in position 1223 flows in conductor X2. If a current in each of the conductors about a storage position is taken as one unit of current, selected position 1212 has four units and nonselected position 1223 has one unit. The same ratio is true of all positions next adjacent a selected position. Other nonselected positions have two units rather than one because they have currents flowing only in associated X or Y conductors.

In order to insure that each incremental increase in the size of a domain provides a like change in light intensity, consecutively larger rings at each position are spaced more closely together. In this manner, the area between each pair of next consecutive rings encompasses like areas. A typical spacing between pairs of next consecutively larger rings may vary as the square root of the radius.

What has been described is considered only illustrative of the principles of this invention. Consequently, various modifications in accordance with those principles can be devised by one skilled in the art without departing from the spirit and scope of this invention.

What is claimed is:

1. In combination, a sheet of magnetic material in which single wall domains can be moved, first means for defining in said sheet a plurality of positions for single wall domains, second means for defining in each of said positions a plurality of consecutively larger stable locations for the domain occupying that position, and means for selectively providing fields to expand and contract said domains to a selected one of said stable locations in each of said positions.

2. A combination in accordance with claim 1 wherein said second means comprises consecutively larger concentric magnetically soft rings including a first ring overlying each of said positions and encompassing a first area thereof.

3. A combination in accordance with claim 2 also including an opaque disk overlying said first ring and said first area.

4. A combination in accordance with claim 3 also including means for directing polarized light at said positions.

5. In combination, a sheet of magnetic material in which single wall domains can be moved, an array of magnetically soft first rings each contiguous said sheet and having a first diameter, an opaque disk covering each of said rings, a magnetically soft second ring having a second diameter greater than said first diameter about each of said first rings, and means for selectively generating fields to expand and contract domains between said first and second rings at each position in said array, said last-mentioned means comprising X and Y oriented conductors and means for pulsing said X and Y conductors in a manner to generate said fields.

6. A combination in accordance with claim 5 including a plurality of additional rings about each of said first and second rings, said plurality of rings being arranged concentrically and with increasingly larger diameters.

7. A combination in accordance with claim 6 including means for directing polarized light at said sheet and an analyzer for passing only that light associated with a single wall domain in each storage position.

8. A combination in accordance with claim 7 wherein said magnetically soft rings comprise permalloy.

9. A combination in accordance with claim 8 wherein said means for selectively generating fields includes means for generating a field of a polarity to contract domains and means for generating a sequence of fields each of a polarity to expand domains incrementally to a next adjacent larger ring.

10. A combination in accordance with claim 8 wherein said means for selectively generating fields includes means for generating a field of a polarity to contract domains and means for generating a field of a polarity to expand domains and of a duration to determine the number of concentric rings to which a domain is to expand.

11. A combination in accordance with claim 5 wherein said first, second, and plurality of additional rings at each storage position have diameters such that like areas are defined between each pair of next adjacent rings.

References Cited

UNITED STATES PATENTS

| | | | |
|---|---|---|---|
| 3,460,116 | 8/1969 | Bobeck et al. | 340—174 |
| 3,463,880 | 8/1969 | Corson | 178—7.2 |

JAMES W. MOFFITT, Primary Examiner